United States Patent
Hsu et al.

[11] Patent Number: 6,086,782
[45] Date of Patent: *Jul. 11, 2000

[54] HEAT TRANSFER FLUID COMPOSITIONS FOR LOW TEMPERATURE APPLICATIONS

[75] Inventors: James T. Hsu, Bethlehem, Pa.; Kenneth F. Wieland, East Windsor, N.J.; Satish Mohapatra, Bethelem; Daniel J. Loikits, Northampton, both of Pa.

[73] Assignee: Advanced Fluid Technologies, Inc., Whitehall, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/674,348

[22] Filed: Jul. 2, 1996

[51] Int. Cl.[7] ............................. C09K 5/00; C09K 5/10
[52] U.S. Cl. ............................ 252/73; 252/570; 585/20; 585/24
[58] Field of Search ................. 252/73, 570; 585/20, 585/24; 510/407

[56] References Cited

U.S. PATENT DOCUMENTS

| | | | |
|---|---|---|---|
| 3,597,355 | 8/1971 | Hsu | 252/73 |
| 3,695,056 | 10/1972 | Glynn et al. | 62/168 |
| 4,046,533 | 9/1977 | Olund | 62/468 |
| 4,829,897 | 5/1989 | Wyman et al. | 101/483 |
| 4,975,215 | 12/1990 | Abe et al. | 252/73 |
| 5,259,198 | 11/1993 | Viegas et al. | 67/7 |
| 5,305,825 | 4/1994 | Roehrich et al. | 165/64 |
| 5,311,927 | 5/1994 | Taylor et al. | 165/64 |
| 5,340,493 | 8/1994 | Principato | 134/38 |
| 5,368,765 | 11/1994 | Kaneko | 252/68 |

FOREIGN PATENT DOCUMENTS 3-68681  3/1991  Japan.

OTHER PUBLICATIONS

Chemical Abstracts, AN:119; 34173, "Headspace Analysis of the dried herb of passion flower . . . ", Buchbauer et al, 1992. no month available.

*Primary Examiner*—Christine Skane
*Attorney, Agent, or Firm*—Sanford J. Piltch

[57] ABSTRACT

Heat transfer fluid compositions comprising (a) a terpene component, comprising at least one terpene; and (b) an alkylbenzene component, comprising at least one alkylbenzene; wherein the components are provided in an effective amount such that the 5resultant composition retains the liquid phase at temperatures in the range from about 0° F. to below about −120° F., preferably from about 0° F. to about −175° F.

23 Claims, 4 Drawing Sheets

TEMP. vs. TIME FOR 95.6 WT% d-LIMONENE
AND FOR 50 VOL% CUMENE IN d-LIMONENE

HEAT TRANSFER FLUID COMPOSITIONS FOR LOW TEMPERATURE APPLICATIONS

FIELD OF THE INVENTION

The invention relates to the field of heat transfer processes. Specifically, the invention concerns low temperature heat transfer liquids suitable for use in heat transfer processes for the transfer of thermal energy at temperatures significantly below 0° F. by means of a specially formulated low temperature heat transfer fluid composition. More specifically, the invention relates to heat transfer fluid compositions comprising blends containing a terpene component, comprising at least one terpene, and an alkylbenzene component, comprising at least one alkylbenzene.

BACKGROUND OF THE INVENTION

There are many conventional heat transfer processes which act to transfer thermal energy to or from an object through physical contact with a heat transfer liquid which is either at a temperature hotter or colder than the object. A number of organic solvents have been used as such heat transfer liquids, for example, Dowtherm for high temperature heat transfer processes and low molecular weight alcohols, ketones and halogenated hydrocarbons for low temperature heat transfer processes.

Low temperature heat transfer processes continue to have difficulties caused by the volatility, toxicity, flammability, foaming or low temperature viscosity changes of the conventional low temperature organic heat transfer liquids. Such conventional low temperature heat transfer liquids exhibit considerable viscosity change or freezing and foaming as their temperature is reduced. Furthermore, the freezing and boiling points of these heat transfer liquids necessarily restrict the operational temperature range of the heat transfer processes in which they are used.

Heat transfer liquids which might otherwise be useful may exhibit too high a freezing point or too low a boiling point, or both, to be efficiently employed in low temperature heat transfer processes. Specifically, the freezing or gelation of a low temperature heat transfer liquid will likely lead to a significant reduction in the efficiency of the thermal energy transfer. This reduction in efficiency will result from significant viscosity increases as well as clogging of transfer lines or other parts of the heat transfer apparatus which will act to interrupt or impede the circulation of the heat transfer liquid within the heat transfer process equipment.

Also, some conventional low temperature heat transfer liquids such as acetone, absorb moisture present in their surroundings. Thus, heat transfer processes employing such fluids may be adversely affected by a rise in the freezing point temperature due to the absorption of moisture. Accordingly, the absorbed moisture (water) may constitute a disadvantage for low temperature heat transfer processes.

One class of heat transfer liquids known for being beneficial for lower temperature heat transfer processes (between 0° F. and –142° F.) are certain chemical compounds of the class of monocyclic terpenes. U.S. Pat. No. 3,597,355 (Hsu) describes the use of monocyclic terpenes as a class, and d-limonene in particular, as being useful for low temperature applications employing heat transfer liquids. The class of monocyclic terpenes is described as consisting of limonene, dipentene, terpinolene, α, β and γ terpinene, among others. The Hsu patent describes d-limonene as particularly preferred because of its characteristic properties. However, the Hsu patent does not describe the benefits of combining a terpene with an alkylbenzene to produce the composite heat transfer fluid compositions of the invention, which exhibit improved low temperature operating characteristics.

Monocyclic terpenes are chemical compounds conventionally used as solvents, and also for a variety of other purposes such as the flavoring of foodstuffs. Monocyclic terpenes are described in the Hsu patent as being particularly useful in heat transfer processes which employ a heat transfer liquid as a means by which the heat is transferred, but only with an example using d-limonene. Such a heat transfer process might involve the circulation, by means of a pump or convection, in a conduit system in heat exchange contact with an apparatus from which heat is to be removed. The heat transfer liquid circulated is maintained at a temperature lower than that of the apparatus to be cooled by a suitable cooling mechanism.

The Hsu patent describes monocyclic terpenes as exhibiting relatively little viscosity change over the entire liquid phase temperature range, and thus, can advantageously retain excellent fluidity even at low temperatures which are slightly above their respective freezing points. Additionally, monocyclic terpenes have low surface tensions and display excellent wetting of metallic and non-metallic surfaces, properties which enhance heat transfer efficiency and minimize ice formation on such surfaces.

The specific teaching of the Hsu patent is the use of single monocyclic terpenes for use as heat transfer liquids. Since the grant of the Hsu patent, the cost of orange oil and commercially available limonene (d- or l-) has increased significantly. Furthermore, according to the Hsu patent, naturally occurring limonene is suitable for use as a heat exchange liquid without further refinement. The Hsu patent continues by stating that it is usually desirable to subject naturally occurring limonene to further distillation to provide relatively pure d-limonene for use as a heat exchange liquid. Relatively pure d-limonene, however, exhibits a reduction in heat exchange efficiency at temperatures below –120° F. At such temperatures the viscosity of relatively pure d-limonene increases significantly. At temperatures below –140° F., relatively pure d-limonene begins to gel. Such viscosity increase and gelation effectively limits the use of relatively pure d-limonene to heat transfer processes that operate at temperatures above –120° F.

What is needed are heat transfer fluid compositions with improved low temperature operating characteristics. Specifically, what is needed are heat transfer fluid compositions which remain in the liquid phase at temperatures from about 0° F. to below –120° F., preferably from about 0° F. to about –175° F.

SUMMARY OF THE INVENTION

It has been surprisingly found that heat transfer fluid compositions comprising (a) a terpene component, comprising at least one terpene; and (b) an alkylbenzene component, comprising at least one alkylbenzene; are suitable for use as heat exchange liquids for low temperature applications.

It is an object of the invention to provide heat transfer fluid compositions which exhibit improved performance characteristics under low temperature conditions, namely compositions which have a wide operational temperature range in which they remain in the liquid phase and in which they do not exhibit a significant increase in viscosity or gelation. Such significant viscosity increases and gelation may cause a reduction in the efficiency of the heat transfer system in which the fluids are employed by impeding the circulation of the fluid within the heat transfer system apparatus.

It is another object of the invention to provide heat transfer fluid compositions comprising (a) a terpene component, comprising at least one terpene; and, (b) an alkylbenzene component, comprising at least one alkylbenzene; wherein the components are provided in an effective amount such that the resultant composition remains in the liquid phase at temperatures in the range from about 0° F. to below −120° F., preferably from about 0° F. to about −175° F.

It is another object of the invention to provide heat transfer fluid compositions wherein the terpene component comprises at least one terpene selected from the group of terpenes listed in Table 2 and derivatives thereof and wherein the resultant composition remains in the liquid phase at temperatures in the range from about 0° F. to below −120° F., preferably from about 0° F. to about −175° F.

It is another object of the invention to provide heat transfer fluid compositions wherein the terpene component comprises at least one terpene selected from the group of terpenes consisting of d-limonene, terpinolene, α-terpinene, γ-terpinene, myrcene, 3-carene, sabinene, α-pinene and camphene and wherein the resultant composition remains in the liquid phase at temperatures in the range from about 0° F. to below −120° F., preferably from about 0° F. to about −175° F.

It is another object of the invention to provide heat transfer fluid compositions wherein the terpene component comprises at least one terpene selected from the group of terpenes consisting essentially of d-limonene and terpinolene and wherein the resultant composition remains in the liquid phase at temperatures in the range from about 0° F. to below −120° F., preferably from about 0° F. to about −175° F.

It is another object of the invention to provide heat transfer fluid compositions wherein the alkylbenzene component comprises at least one alkylbenzene selected from the group of alkylbenzenes including cumene, diethyl benzene, methyl propyl benzene, propyl benzene and butyl benzene and wherein the resultant composition remains in the liquid phase at temperatures in the range from about 0° F. to below −120° F., preferably from about 0° F. to about −175° F.

It is another object of the invention to provide a low temperature heat transfer system using a heat transfer liquid comprising (a) transferring thermal energy from the heat transfer liquid to a cooling fluid such that the heat transfer liquid is cooled to a temperature between about 0° F. and about −175° F.; (b) transferring thermal energy from an object to be cooled to the heat transfer liquid; and, (c) repeating (a) and (b) until said object is cooled to the desired temperature; wherein said heat transfer liquid consists of a heat transfer fluid composition comprising (a) a terpene component, comprising at least one terpene; and (b) an alkylbenzene component, comprising at least one alkylbenzene and wherein said components are provided in an effective amount such that the resultant composition remains in the liquid phase at temperatures in the range from about 0° F. to about −175° F.

BRIEF DESCRIPTION OF THE DRAWINGS

For the purpose of illustrating the invention, forms are shown in the drawings which are presently preferred. It must be understood, however, that the invention is not limited to the precise arrangements and instrumentalities shown.

DETAILED DESCRIPTION OF THE PREFERRED EMBODIMENTS

The novel heat transfer fluid compositions of the invention exhibit low freezing point temperatures and a broad range of temperatures over which they retain the liquid phase. Both of these characteristics are very desirable for low temperature heat transfer fluids. Specifically, the heat transfer fluid compositions of the invention can be used in heat transfer process systems with operating temperatures on the heat transfer liquid side of between about 0° F. and about −120° F., preferably between about 0° F. and about −175° F. Furthermore, the heat transfer fluid compositions of the invention allow for a wide range of operating conditions under which they will not vaporize or freeze.

The following detailed description represents the best presently contemplated mode of carrying out the invention. The description is not intended in a limiting sense, and it is made solely for the purpose of illustrating the general principles of the invention. The various features and advantages of the present invention may be more readily understood with reference to the following detailed description taken in conjunction with the accompanying drawings and claims.

The term "terpenes" traditionally applied to cyclic hydrocarbons having structures with empirical formula $C_{10}H_{16}$ which occur in the essential oils of plants. Knowledge of the chemistry of the terpene field has developed and compounds related both chemically and biogenetically to the $C_{10}H_{16}$ carbons have been identified. Some natural products have been synthesized and other synthetic compounds resemble known terpene structures. Consequently, the term "terpenes" may now be understood to include not only the numerous $C_{10}H_{16}$ hydrocarbons, but also their hydrogenated derivatives and other hydrocarbons possessing similar fundamental chemical structures. These hydrocarbons may be acyclic or cyclic, simple or complex, and of natural or synthetic origin. The cyclic terpene hydrocarbons may be classified as monocyclic, bicyclic, or tricyclic. Many of their carbon skeletons have been shown to consist of multiples of the isoprene nucleus, $C_5H_8$.

It is known that certain monocyclic terpenes, particularly d-limonene, may be used as heat transfer fluids. Note that in this disclosure the term d-limonene will be understood to refer to commercially available "d-limonene". Those skilled in the art will know that commercially available d-limonene is not 100% pure d-limonene. For example, d-limonene, commercially available as food grade d-limonene from Florida Chemical, was subjected to gas chromatograph analysis which resulted in the determination of the minor constituent components of the relatively pure d-limonene mixture as shown in Table 1.

TABLE 1

| Component Chemical Compound | % by weight in Commercial d-limonene |
| --- | --- |
| d-limonene | 95.6% |
| octanal | 0.4% |
| sabinene | 0.7% |
| α-pinene | 0.6% |
| myrcene | 2.7% |

The various compounds recited in Table 1 may be classified as follows: d-limonene is a monocyclic terpene; 3-carene, sabinene and α-pinene are bicyclic terpenes; myrcene is an acyclic terpene; and octanal is a non-terpene compound.

Figure 1:
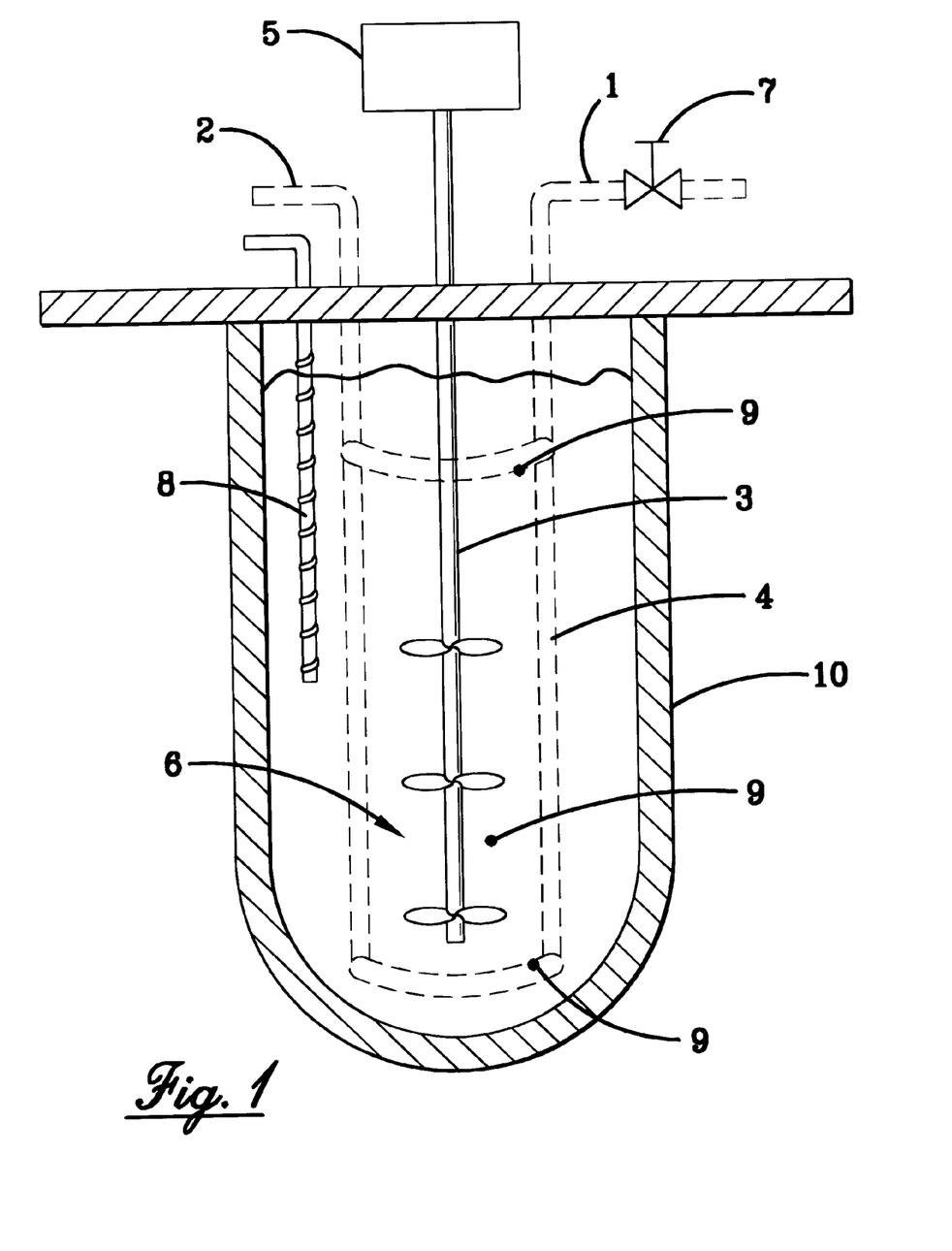
FIG. 1 is a depiction of the experimental apparatus used to test the freezing and melting point temperature characteristics of the heat transfer fluid compositions of the invention.

Experiments were performed on a sample of food grade d-limonene obtained from Florida Chemical. The purpose of these experiments was to determine the freezing point temperature and melting point temperature of the d-limonene. These tests were performed using the apparatus depicted in FIG. 1. The test apparatus shown in FIG. 1 is called a cryostat. Most of the components of the apparatus were fabricated by Loikits Industrial Services. The principal components of the apparatus are a cold finger or nitrogen evaporator coil (4) made of copper to which liquid nitrogen enters through the liquid nitrogen line (1) and exits through line (2). The cold finger (4) is submerged in a bath of liquid (6) whose freezing/melting characteristics are to be determined. Agitation of liquid (6) is provided by a mechanical stirrer (3) connected to a motor (5). Thermocouples (9) are located at different points to measure the temperatures of the liquid (6) as well as the cold finger (4). The glass dewar (10) is vacuum jacketed to provide insulation from the ambient surroundings.

The procedure used to determine the freezing/melting point characteristics of the food grade d-limonene follows:

1. measuring out about 600 ml of d-limonene;
2. optionally drying the d-limonene by passing it through a drierite column;
3. pouring the 600 ml of d-limonene into a clean dewar (10);
4. agitating the d-limonene with stirrer (3) rotating at a rate of about 2,400 rpm;
5. cooling the d-limonene by initiating the flow of liquid nitrogen to the cold finger (4) by opening control valve (7);
6. operating control valve (7) to regulate the flow of liquid nitrogen to the cold finger (4) such that the temperature difference between the d-limonene in the dewar and the cold finger does not exceed 30° F.;
7. continuing cooling until the d-limonene freezes, or until the temperature minimum for the apparatus is reached (i.e., continued cooling does not result in a reduction in the d-limonene temperature; this minimum temperature has been observed to be about –175° F. for the test apparatus used);
8. observing the temperature of the d-limonene when freezing occurs, if freezing occurs during the cooling phase;
9. stopping the flow of liquid nitrogen to the cold finger (4) to allow the d-limonene to warm through absorption of heat from the ambient surroundings;
10. observing the temperature of the d-limonene when freezing occurs, if freezing occurs during the warming phase; and,
11. optionally heating the d-limonene with heater (8) to speed melting during the experiment.

The following observations were made during the experiments performed on the d-limonene. The d-limonene formed a gel phase at temperatures below about –120° F. It was observed that sudden gelation occurred at or just below about –130° F. Upon repeating the experiment, the gelation point was confirmed to be approximately –130° F. Gelation of commercial d-limonene at the temperature noted would tend to cause a significant increase in the viscosity of the d-limonene at such temperatures. Using a temperature driving force of about 5° F. (i.e., maintaining the temperature of the cooling element at a temperature about 5° F. colder than the d-limonene) and providing gentle agitation, it was possible to supercool the d-limonene to a temperature below –160° F. without freezing. After cooling the d-limonene in the test apparatus to about –160° F., the flow of liquid nitrogen to the evaporation coil (4) was stopped and the d-limonene was allowed to absorb heat from the surrounding environment at ambient temperature, 65° F. Upon warming the d-limonene underwent rapid freezing.

Figure 2:
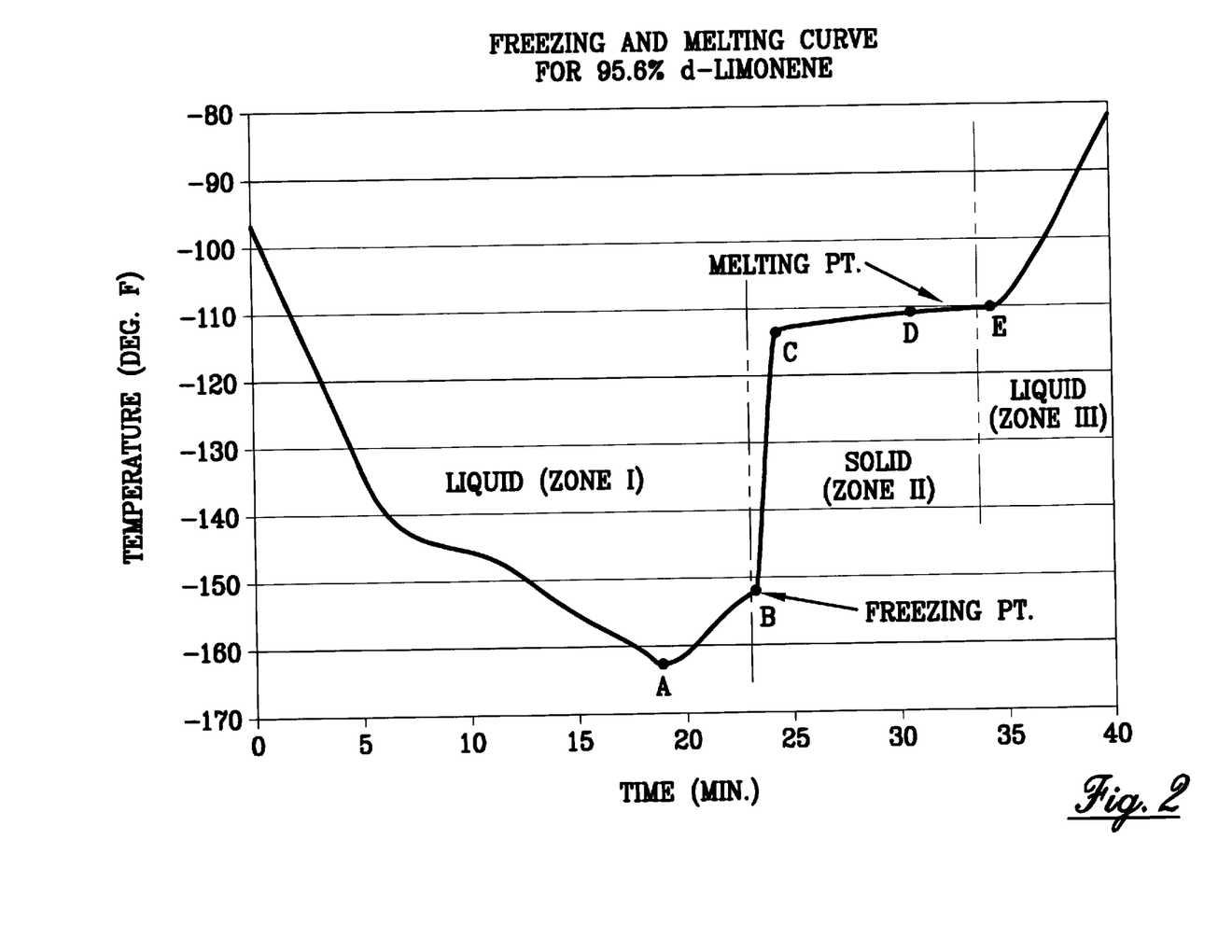
FIG. 2 is a chart showing the experimental freezing and melting temperature versus time curve for pure (95.6% by weight) d-limonene.

The results of the experiments performed on the d-limonene are provided in graphical form in FIG. 2. These experiments demonstrate that the d-limonene tested had a freezing point temperature of about –153° F. and a melting point temperature of about –110° F.

Referring to FIG. 2, this chart graphically demonstrates the temperature reduction in degrees Fahrenheit against time for d-limonene. The initial liquid phase of the d-limonene tested is shown as Zone I in FIG. 2. In the initial liquid phase, the temperature of the d-limonene in the experimental bath was reduced with data being plotted in FIG. 2 beginning at a temperature of approximately –100° F. After approximately 19 minutes, the d-limonene was cooled to about –163° F., Point A. The flow of liquid nitrogen was then stopped and the d-limonene was allowed to warm by absorbing heat from the ambient surroundings. After about 4 minutes, the d-limonene increased in temperature to approximately –153° F., Point B. At this temperature amorphous solidification was observed. Accordingly, –153° F. was determined to be the nominal freezing point temperature for the d-limonene.

The solid phase of the d-limonene tested is shown as Zone II in FIG. 2. The solid phase began at approximately –153° F., Point B. During the about one minute following Point B, significant solidification occurred resulting in the gelation of the d-limonene. The solidification of the d-limonene was accompanied by an increase in temperature. The gelation or solidification of the d-limonene ended at about one minute after its freezing point temperature was reached, or about 24 minutes into the experiment, Point C. The temperature of the d-limonene was approximately –113° F. when freezing was complete. During the solid phase in Zone II between Points C and D, the d-limonene was warmed to approximately –110° F. by the absorption of heat from the atmosphere surrounding the test apparatus. This solid phase existed for approximately seven to eight minutes. The d-limonene began to melt when its temperature reached about –110° F., Point D. After about four minutes, the melting was complete, Point E.

The second liquid phase of the d-limonene tested is shown as Zone III in FIG. 2. The second liquid phase began at about –110° F., Point E. Accordingly, the melting point temperature of the d-limonene was determined to be approximately –110° F. Thus, as a result of this experimental analysis of the commercially available d-limonene, it was determined that d-limonene has a freezing point temperature of about –153° F. and a melting point temperature of about –110° F. Note, however, that the freezing point temperature of commercially available d-limonene is not consistent, namely it varies depending upon what impurities are present and on the degree of agitation provided. Notwithstanding, the melting point temperature of the commercially available d-limonene was consistently about −110° F.

An identical test using the same test apparatus was performed on terpinolene to determine its freezing point and melting point temperatures. The terpinolene was determined to have a freezing point temperature of about −134° F. and to have a melting point temperature of about −95° F.

Furthermore, the same test apparatus was used to determine the freezing point and melting point temperatures of two alkylbenzenes, namely cumene and diethyl benzene. The cumene tested was obtained from Aldrich Chemicals. The freezing point temperature and the melting point temperature of the cumene tested was determined to be the same temperature, namely about −145° F. The diethyl benzene tested was also obtained from Aldrich Chemicals and was actually a mixture of three isomers, namely 1,2-diethyl benzene; 1,3-diethyl benzene; and 1,4-diethyl benzene. The freezing point and the melting point temperatures of the diethyl benzene tested were determined to be the about −148° F. and about −130° F., respectively.

It has been surprisingly found that alkylbenzenes can be mixed with terpenes to obtain heat transfer fluid compositions that exhibit characteristics which are superior to either component alone. Specifically, various mixtures of terpenes can be cooled to temperatures as low as −175° F. without freezing. The viscosity of these mixtures, however, varies at the reduced temperatures. It has been discovered that mixtures of terpene and alkylbenzene produce distinctly different physical properties as compared to either terpenes or alkylbenzenes alone. Particularly, it has been discovered that certain heat transfer fluid compositions comprising a terpene component, comprising at least one terpene, and an alkylbenzene component, comprising at least one alkylbenzene, exhibit freezing point temperatures that are lower than either the terpene or the alkylbenzene component alone.

The heat transfer fluid compositions of the invention comprise (a) a terpene component, comprising at least one terpene; and (b) an alkylbenzene component, comprising at least one alkylbenzene. The terpene component and the alkylbenzene component are provided in an effective amount such that the resultant compositions are suitable for use as heat transfer liquids for low temperature applications. Specifically, the terpene component and the alkylbenzene component are provided in an effective amount such that the resultant composition retains the liquid phase at temperatures from about 0° F. to about −120° F., preferably from about 0° F. to about −175° F.

The terpene component of the heat transfer fluid compositions of the invention comprises at least one terpene. The at least one terpene may be selected from the group of terpenes comprising the terpenes listed in Table 2 as well as the derivatives of the listed terpenes. Preferably, the at least one terpene may be selected from the group of terpenes consisting of d-limonene, terpinolene, α-terpinene, γ-terpinene, myrcene, 3-carene, sabinene, α-pinene and camphene. Most preferably, the at least one terpene may be selected from the group of terpenes consisting essentially of d-limonene and terpinolene.

TABLE 2

ACYCLIC TERPENES geraniolene
myrcene
dihydromyrcene
ocimene
allo-ocimene

MONOCYCLIC TERPENES

| | |
|---|---|
| ρ-menthane | carvomenthene |
| menthene | dihydroterpinolene |
| dihydrodipentene | α-terpinene |
| γ-terpinene | α-phellandrene |
| pseudolimonene | limonene |
| d-limonene | 1-limonene |
| d,1-limonene | isolimonene |
| terpinolene | isoterpinolene |
| β-phellandrene | β-terpinene |
| cyclogeraniolane | pyronane |
| α-cyclogeraniolane | β-cyclogeraniolene |
| γ-cyclogeraniolene | methyl-γ-cyclogeraniolene |
| α-pyronene | cyclodihydromyrcene |
| β-pyronene | γ-pyronene |
| 1-ethyl-5,5-dimethyl-1,3-cyclohexadiene | |
| 2-ethyl-6,6-dimethyl-1,3-cyclohexadiene | |
| 2-ρ-menthene | 1(7)-ρ-menthene |
| 2,4-ρ-menthadiene | 2,5-ρ-menthadiene |
| 1(7),4(8)-ρ-menthadiene | 3,8-ρ-menthadiene |
| 1,2,3,5-tetramethyl-1,3-cyclohexadiene | |
| 1,2,4,6-tetramethyl-1,3-cyclohexadiene | |
| 1,6,6-trimethylcyclohexene | 1,1-dimethylcyclohexane |

BICYCLIC TERPENES

| | |
|---|---|
| norsabinane | northujene |
| 5-isopropylbicyclo[3.1.0]hex-2-ene | |
| thujane | β-thujene |
| α-thujene | sabinene |
| 3,7-thujadiene | norcarane |
| 2-norcarene | 3-norcarene |
| 2,4-norcaradiene | carane |
| 2-carene | 3-carene |
| β-carene | nonpinane |
| 2-norpinene | apopinane |
| apopinene | orthodene |
| norpadiene | homopinene |
| pinane | 2-pinene |
| 3-pinene | β-pinene |
| verbenene | homoverbanene |
| 4-methylene-2-pinene | norcamphane |
| apocamphane | camphane |
| α-fenchane | α-fenchene |
| santenane | santane |
| norcamphene | camphenilane |
| fenchane | isocamphane |
| β-fenchane | camphene |
| β-fenchene | 2-norbornene |
| apobornylene | bornylene |
| 2,7,7-trimethyl-2-norbornene | santene |
| camphenilene | isofenchene |
| isocamphodiene | 1,2,3-trimethyl-2-norbornene |
| 2,5,5,-trimethyl-2-norbornene | |

The derivatives of the terpenes listed in Table 2 consist of both monocyclic and bicyclic terpene derivatives. The monocyclic terpene derivatives which may be used in the heat transfer fluid compositions of the invention include the derivatives of the acyclic and monocyclic terpenes listed in Table 2. There are two basic categories of these derivatives. The first category includes monocyclic terpenes which may be readily formed from acyclic terpenes by ring closure and from bicyclic terpenes by ring fission. A monocyclic terpene contains a six-carbon ring and may be considered a derivative of either cyclohexane or benzene with a common base carbon ring structure of $C_{10}H_6$. The various derivatives fall into a classification of either Type A or Type B. The Type A group of monocyclic terpenes may be considered derivatives from menthane (isopropylmethylcyclohexane) or from cymene (isoprophylmethylbenzene), all of which may be considered propyl compounds based on the carbon ring structure. The Type B monocyclic terpenes may be considered derivatives of dimethylcyclohexane, for which there is no trivial name, and may be considered derivatives of methyl compounds based upon the carbon ring structure.

The second category of derivative adds an atom, functional group or another molecule to the terpene compound. For example the terpene molecule may be oxygenated; hydrogenated; halogenated; nitrogenated; modified with silicon based compounds; or reacted to incorporate a functional group such as an hydroxy, ester, ketone, amine, amide, amino, carboxyl or the like.

The bicyclic terpene derivatives which may be used in the heat transfer fluid compositions of the invention include the bicyclic derivatives of the terpenes listed in Table 2. The various derivatives which may be classified as bicyclic terpenes fall into four categories, namely thujane (sabinane), carane, α-pinane and bornane (camphane), each category designating a different class of bicyclic structures. These bicyclic terpene structures, also consisting of the basic chemical unit $C_{10}H_{16}$, resemble the menthane Type A monocyclics and may be considered to be derivatives of propyl compounds with carbon ring structures containing a gem-dimethyl configuration with either an isopropyl group or a hexane or hectane group based upon the carbon ring structure. As above, this describes the first derivative type for the bicyclic terpene compounds. The second derivative type described in connection with the monocyclic terpenes also describes the second derivative type for bicyclic terpenes. The detailed structure of these terpene hydrocarbons are described in "Nomenclature for Terpene Hydrocarbons", *Advances in Chemistry Series No.* 14 (American Chemical Society), 1955, which is incorporated herein by reference.

The alkylbenzene component of the heat transfer fluid compositions of the invention comprises at least one alkylbenzene. An alkylbenzene is defined as a benzene alkylated with a hydrocarbon. The at least one alkylbenzene may be selected from the group of alkylbenzenes comprising cumene, diethyl benzene, methyl propyl benzene, propyl benzene and butyl benzene.

The heat transfer fluid compositions of the invention may optionally contain various additives. For example, the fluid compositions of the invention may optionally contain at least one of an antioxidant, e.g. butylated hydroxy toluene (BHT) and vitamin E; and a stabilizing agent, e.g. hydroquinone.

The invention will now be illustrated by the following Examples, which are intended to be purely exemplary and not limiting. In each of the following examples the d-limonene used had an assay like that shown in Table 1, above, and is commercially available from Florida Chemicals as food grade d-limonene; the diethyl benzene used consisted of a mixture of isomers, namely 1,2-diethyl benzene; 1,3-diethyl benzene and 1,4-diethyl benzene, and is commercially available from Aldrich Chemicals; the cumene used had a purity of 98%, and is commercially available from Aldrich Chemicals; the terpinolene used had an assay like that shown in Table 3, and is commercially available from Glidco Organics in Florida.

TABLE 3

| Component Chemical Compound | % by weight in Commercial Terpinolene |
|---|---|
| terpinolene | 99% |
| linolool | <1% |
| γ-terpinene | <1% |
| octanol | <1% |

The test apparatus and procedure presented above with regard to the analysis done to determine the freezing/melting point temperature characteristics of commercially available d-limonene were used to determine the freezing/melting point temperature characteristics of the heat transfer fluid compositions discussed in the following examples. In considering these examples, however, notice should be given to the limitations in the test apparatus used. Particularly, due to the limitations in the test apparatus the lowest temperature that could be obtained in the heat transfer fluid compositions tested was about −175° F. Many of the heat transfer fluid compositions tested have freezing point temperatures at least as low as −175° F. Due to the limitations of the test apparatus it could not be determined how far below −175° F. the freezing point temperatures of these liquids are. Notwithstanding, it should be understood by one skilled in the art that the heat transfer fluid compositions of the invention may have, and in many instances do have, freezing point temperatures below −175° F.

EXAMPLE 1

Using the same testing apparatus and procedure as discussed above with regard to d-limonene, tests were performed to determine the freezing/melting point temperature characteristics of a heat transfer fluid composition comprising about 20% by volume diethyl benzene and about 80% by volume terpinolene. The freezing point temperature for the diethyl benzene/terpinolene composition was determined to be about −157° F.

EXAMPLE 2

Figure 3:
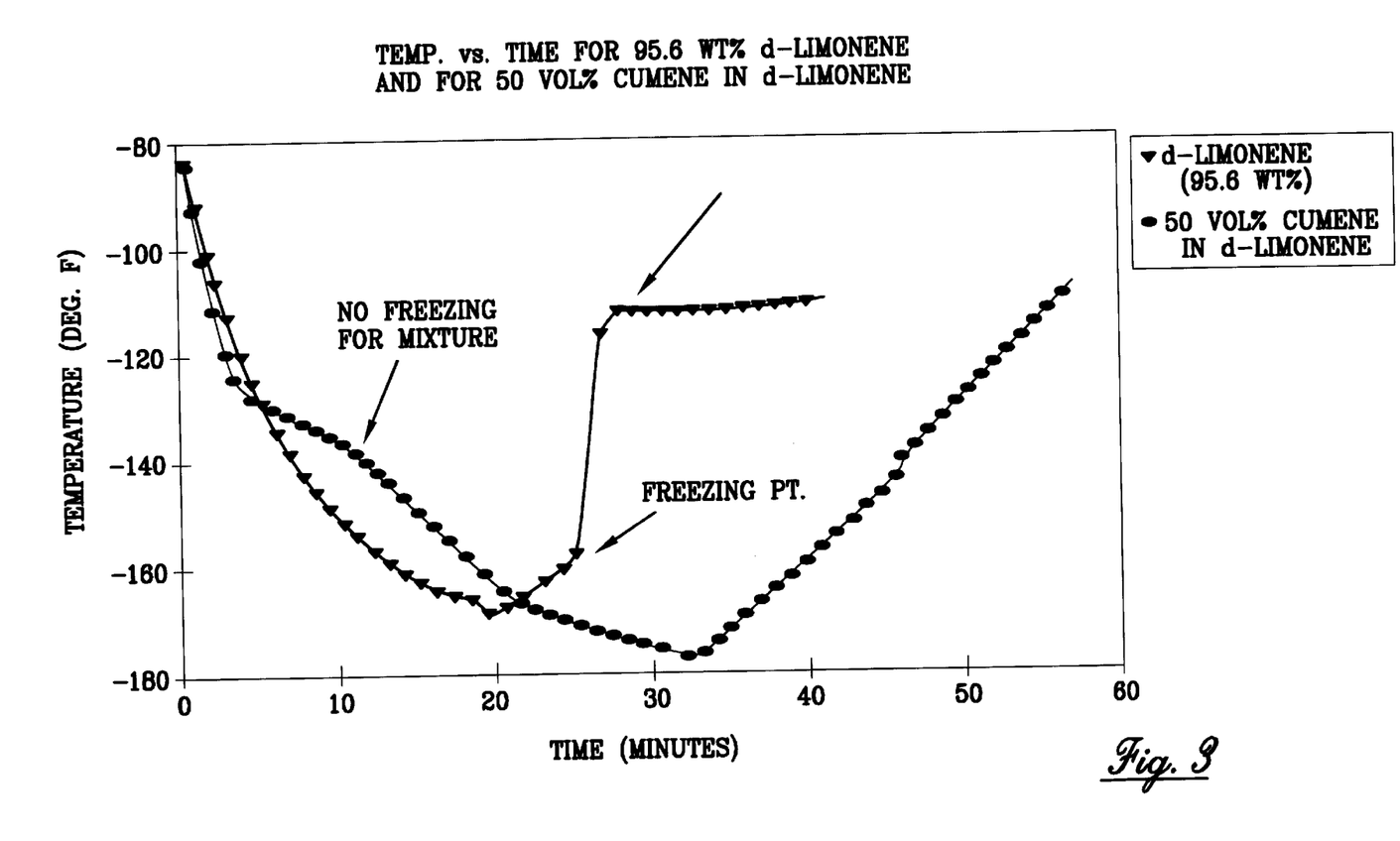
FIG. 3 is a chart showing the experimental freezing/melting temperature versus time curve for pure (95.6% by weight) d-limonene in comparison with the experimental freezing/melting temperature versus time curve for a heat transfer fluid composition consisting of a mixture of d-limonene and cumene, wherein the composition consists of about 50% by volume of cumene in d-limonene.

Using the same apparatus and procedure as in Example 1, a heat transfer fluid composition comprising about 50% by volume cumene in d-limonene was tested. The composition was cooled to about −175° F. The composition was then allowed to warm. No solidification or crystallization was observed during either the cooling or the warming cycles. The results of the test analysis of the freezing/melting point temperature characteristics of the heat transfer fluid composition comprising about 50% by volume cumene in d-limonene is compared with the freezing/melting characteristics of d-limonene in FIG. 3.

EXAMPLE 3

Using the same apparatus and procedures as in Example 1, a heat transfer fluid composition comprising about 75% by volume cumene and about 25% by volume d-limonene was prepared and tested. The composition was cooled to about −175° F. The composition was then allowed to warm. No solidification or crystallization was observed during either the cooling or the warming cycles.

EXAMPLE 4

The test procedure of Example 2 was repeated several times using heat transfer fluid compositions having different volume percentages of cumene and d-limonene. The behavior of these various compositions was studied to determine the preferred volume percent mixture of cumene to d-limonene with regard to the solidification and viscosity characteristics of the resultant heat transfer fluid composition. It was observed that heat transfer fluid compositions containing less than about 10% by volume cumene exhibited freezing during the heating cycle (i.e., the composition was cooled to about −175° F. without freezing but upon heating, crystallization was observed at about −165° F.). Likewise, compositions containing more than about 88% by volume cumene exhibited freezing during the heating cycle when the temperature rose to about −153° F. However, heat transfer fluid compositions comprising a mixture of d-limonene and cumene with a cumene content between about 10% and about 88% by volume were not observed to exhibit any gelation, crystallization or other solidification upon cooling to about −175° F. or upon the subsequent warming of the composition. Hence, heat transfer fluid compositions comprising d-limonene and cumene, wherein the cumene content is between about 10% and about 88% by volume, have been determined to retain the liquid phase under a range of temperatures from between about 0° F. and approximately −175° F. Thus, heat transfer fluid compositions comprising a mixture of cumene and d-limonene in which the cumene content is from about 10% to about 88% by volume may be used in heat transfer process systems with operating temperatures on the heat transfer liquid side down to at least about −175° F.

Several additional experiments were performed using different blends of terpenes and alkylbenzenes, to demonstrate that the phenomena identified regarding heat transfer fluid compositions comprising mixtures of cumene and d-limonene are common to mixtures of terpenes and alkylbenzenes generally. Specifically, the test procedures used in the pervious examples were performed on heat transfer fluid compositions based on mixtures of varying amounts of terpinolene as the terpene component and diethyl benzene as the alkylbenzene component. Test results for three specific terpinolene/diethyl benzene compositions are provided in the next three examples.

EXAMPLE 5

A heat transfer fluid composition comprising terpinolene and diethyl benzene with a diethyl benzene content of about 10% by volume was prepared and tested. The freezing point temperature of this composition was observed to be about −141° F.

EXAMPLE 6

A heat transfer fluid composition comprising terpinolene and diethyl benzene with a diethyl benzene content of about 40% by volume was prepared and tested. The freezing point temperature of this composition was observed to be about −170° F.

EXAMPLE 7

A heat transfer fluid composition comprising terpinolene and diethyl benzene with a diethyl benzene content of about 60% by volume was prepared and tested. The freezing point temperature of this composition could not be determined because of the limitations of the testing equipment used as discussed previously. However, the composition was cooled down to about −175° F. without any solid formation during cooling or during the subsequent warming cycle. Accordingly, the freezing point temperature of this heat transfer fluid composition was determined to be below −175° F.

Several additional tests were performed to obtain the lower threshold concentration and upper threshold concentration of diethylbenzene in terpinolene. It was observed that heat transfer fluid compositions comprising terpinolene and diethyl benzene with a diethyl benzene content of less than about 50% by volume exhibited a freezing point temperature above about −175° F. Furthermore, heat transfer fluid compositions comprising terpinolene and diethyl benzene with a diethyl benzene content in excess of about 70% by volume likewise exhibited a freezing point temperature above about −175° F. during either the cooling or heating cycle. However, heat transfer fluid compositions comprising a mixture of terpinolene and diethyl benzene with a diethyl benzene content between about 50% and about 70% by volume were not observed to exhibit any gelation, crystallization or other solidification upon cooling to about −175° F. or upon subsequent warming. Hence, heat transfer fluid compositions comprising terpinolene and diethyl benzene in which the diethyl benzene content is between about 50% and about 70% by volume have been determined to remain in the liquid phase at temperatures between about 0° F. and approximately −175° F. Thus, heat transfer fluid compositions comprising a mixture of terpinolene and diethyl benzene in which the diethyl benzene content is from about 50% to about 70% by volume may be used in heat transfer process systems with operating temperatures on the heat transfer liquid side down to at least about −175° F.

EXAMPLE 8

Likewise, the test apparatus and procedures used in the pervious examples were used on a series of heat transfer fluid compositions based on mixtures of varying volume percentages of d-limonene as the terpene component and diethyl benzene as the alkylbenzene component. It was observed that heat transfer fluid compositions comprising d-limonene and diethyl benzene with a diethyl benzene content of less than about 20% by volume exhibited a freezing point temperature above about −175° F. during the warming cycle. Furthermore, heat transfer fluid compositions comprising d-limonene and diethyl benzene with a diethyl benzene content in excess of about 65% by volume likewise exhibited a freezing point temperature above about −175° F. during either the cooling or the warming cycle. However, heat transfer fluid compositions comprising a mixture of d-limonene and diethyl benzene with a diethyl benzene content between about 20% and about 65% by volume were not observed to exhibit any gelation, crystallization or other solidification upon cooling to about −175° F. or upon subsequent warming. Hence, heat transfer fluid compositions comprising d-limonene and diethyl benzene in which the diethyl benzene content is between about 20% and about 65% by volume have been determined to remain in the liquid phase at temperatures between about 0° F. and approximately −175° F. Thus, heat transfer fluid compositions comprising a mixture of d-limonene and diethyl benzene in which the diethyl benzene content is from about 20% to about 65% by volume may be used in heat transfer process systems with operating temperatures on the heat transfer liquid side down to at least about −175° F.

Figure 4:
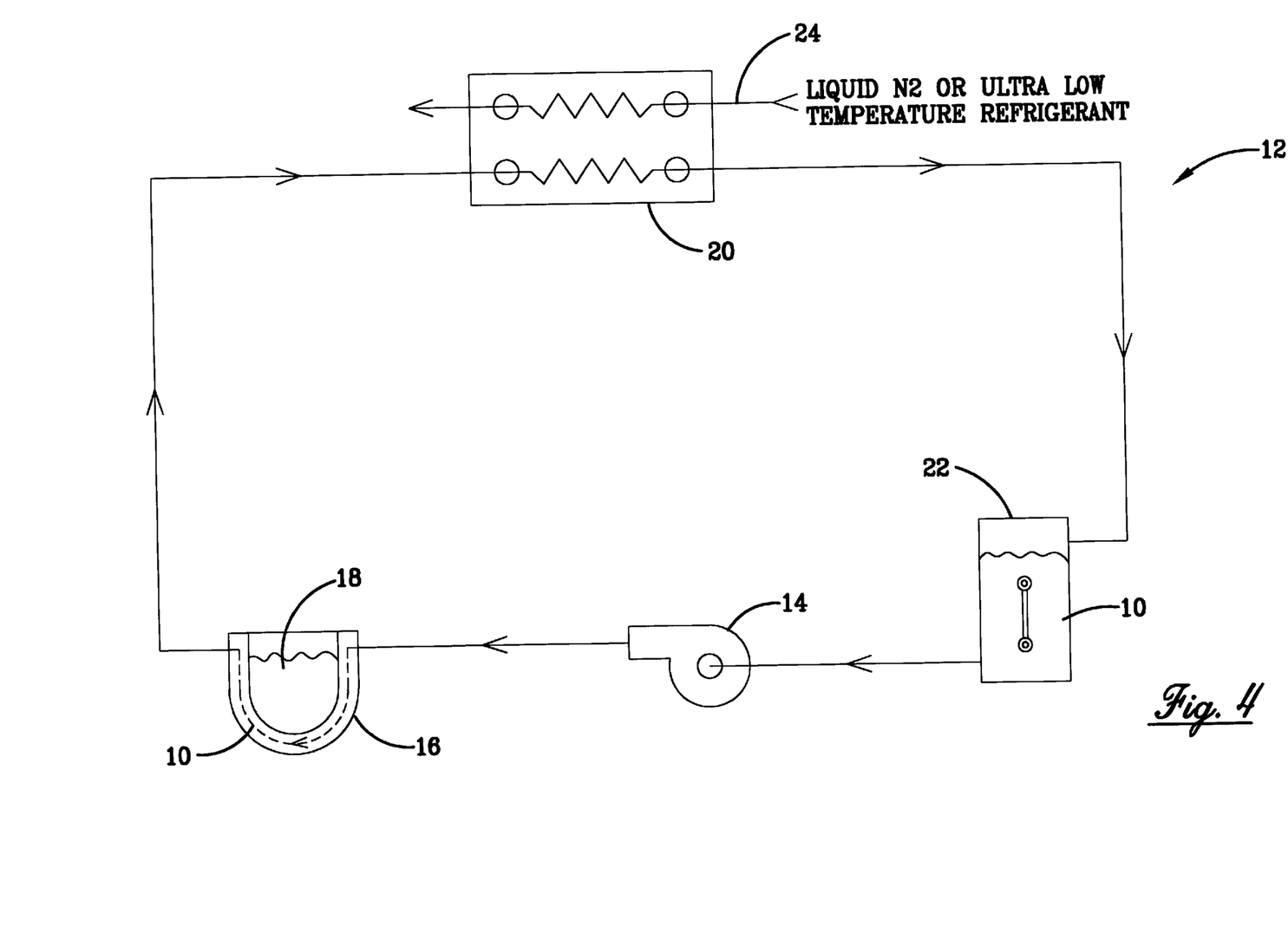
FIG. 4 is a diagrammatic view of a heat transfer process system using a heat transfer fluid composition of the present invention.

Another aspect of the invention resides in the industrial application of the heat transfer fluid compositions of the invention in heat transfer process systems. In order to illustrate the industrial utility of this invention reference should be made to FIG. 4. FIG. 4 depicts a closed loop cooling system (12) comprised of a pump (14), a jacketed vessel (16) holding the object to be cooled (18), a heat exchanger or evaporator (20), and a coolant expansion container (22). Heat transfer liquid (10) comprises a heat transfer fluid composition comprising (a) a terpene component, comprising at least one terpene; and (b) an alkylbenzene component, comprising at least one alkylbenzene wherein the said components are provided in an effective amount such that the resultant composition remains in the liquid phase at temperatures in the range from about 0° F. to below about −120° F., preferably from about 0° F. to about −175° F. The circulation pump (14) draws the liquid (10) from the expansion or storage container (22) and impels the heat transfer liquid (10) through the jacket of the coolant reactor vessel (16) containing the object to be cooled (18). The heat transfer liquid (10) passes through the reactor jacket causing the reduction in temperature of the object material (18) and passes to the heat exchanger (20). The heat exchanger (20) removes the absorbed heat transferred from the object to be cooled (18) in the cooler or chiller reactor (20) by means of heat extraction or cooling by subjecting the heat transfer liquid (10) to a cryogenic fluid (24) such as liquid nitrogen and liquid carbon dioxide or an ultra low temperature refrigerant used in a mechanical refrigeration system, i.e., R-13, R-14, R-23, R-503 and R-508. The cooled heat transfer liquid (10) then returns to the storage/expansion container (22) for recirculation and reuse in the cooling system.

A temperature control device is used to modulate the flow of the cryogenic fluid or refrigerant (24) to maintain the temperature of the recirculating heat transfer liquid (10) at a temperature below about 0° F., preferably below about −120° F., most preferably of about −175° F. The recirculated heat transfer liquid (10) is again pumped to the reactor jacket (16) where it absorbs thermal energy from the object to be cooled (18) in the reactor (16). This causes the heat transfer liquid (10) to increase in temperature. The process is repeated for as long as is necessary until the object to be cooled is cooled to the desired temperature.

The utility of the heat transfer fluid compositions of the invention lie in making available heat transfer liquids with superior physical properties and performance characteristics over currently available heat transfer liquids. Unlike existing heat transfer liquids, the heat transfer fluid compositions of the invention are non-toxic, non-hazardous, and biodegradable. The heat transfer fluid compositions of the invention provide for lower operating temperatures than can be achieved with presently available commercially viable heat transfer liquids. The heat transfer fluid compositions of the invention are of immense value to industries which require very low temperatures for process control, condensation, freeze drying, environmental conditioning, and cold storage. The heat transfer fluid compositions of the invention provide a solution to these needs with safe, economical, and environmentally friendly chemical components.

The present invention may be embodied in other specific forms without departing from the spirit or essential attributes thereof. Accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

We claim:

1. A heat transfer fluid composition consisting essentially of: (a) 10% to 90% by volume of at least one terpene component; and (b) 90% to 10% by volume of at least one alkylbenzene component, in complementary proportional percentage amounts to retain the composition in its liquid phase at any temperature in the entire range from about 0° F. to about −175° F.

2. The heat transfer fluid composition of claim 1, wherein the at least one terpene is selected from the group consisting acyclic terpenes, monocyclic terpenes and bicyclic terpenes.

3. The heat transfer fluid composition of claim 1, wherein the at least one terpene is selected from the group consisting of d-limonene, terpinolene, α-terpinene, γ-terpinene, myrcene, 3-carene, sabinene, α-pinene and camphene.

4. The heat transfer fluid composition of claim 1, wherein the at least one alkylbenzene is selected from the group consisting of cumene, diethyl benzene, methyl propyl benzene, propyl benzene and butyl benzene.

5. The heat transfer fluid composition of claim 1, wherein the terpene component consists essentially of d-limonene and the alkylbenzene component consists essentially of cumene.

6. The heat transfer fluid composition of claim 5, wherein the alkylbenzene component is present in an amount of about 10% to about 88% by volume.

7. The heat transfer fluid composition of claim 5, wherein the alkylbenzene component is present in an amount of about 88% by volume.

8. The heat transfer fluid composition of claim 1, wherein the terpene component consists essentially of d-limonene and the alkylbenzene component consists essentially of diethyl benzene.

9. The heat transfer fluid composition of claim 8, wherein the alkylbenzene component is present in an amount of about 20% to about 65% by volume.

10. The heat transfer fluid composition of claim 1, wherein the terpene component consists essentially of terpinolene and the alkylbenzene component consists essentially of diethyl benzene.

11. The heat transfer fluid composition of claim 10, wherein the alkylbenzene component is present in an amount of about 50% to about 70% by volume.

12. The heat transfer fluid composition of claim 1, wherein the composition further consists of at least one antioxidant and a stabilizing agent.

13. The heat transfer fluid composition of claim 2, wherein the acyclic terpenes are selected from the group consisting of geraniolene; myrcene; dihydromycene; ocimene and allo-ocimene.

14. The heat transfer fluid composition of claim 2, wherein the monocyclic terpenes are selected from the group consisting of ρ-menthane; carvomethene, methene, dihydroterpinolene; dihydrodipentene; α-terpinene; γ-terpinene; α-phellandrene; pseudolimonene; limonene; d-limonene; 1-limonene; d,1-limonene; isolimonene; terpinolene; isoterpinolene; β-phellandrene; β-terpinene; cyclogeraniolane; pyronane; α-cyclogeraniolene; β-cyclogeraniolene; γ-cyclogeraniolene; methyl-γ-pyronene; 1-ethyl-5 5-dimethyl-1,3-cyclohexadiene; 2-ethyl-6,6-dimethyl-1,3-cyclohexadiene; 2-ρ-menthene 1(7)-ρ-methadiene; 3,8-ρ-menthene; 2.4-ρ-menthadiene; 2,5-ρ-menthadiene; 1(7),4(8)-ρ-methadiene; 3,8-ρmenthadiene; 1,2,3,5-tetramethyl-1-3-cyclohexadiene; 1,2,4,6-tetramethyl-1,3-cyclohexadiene; 1,6,6-trimethylcyclohexene and 1,1-dimethylcyclohexane.

15. The heat transfer fluid composition of claim 2, wherein the bicyclic terpenes are selected from the group consisting of norsabinane; northujene; 5-isopropylbicyclohex-2-ene; thujane; β-thujene; α-thujene; sabinene; 3,7-thujadiene; norcarane; 2-norcarene; 3-norcarene; 2-4-norcaradiene; carane; 2-carene; 3-carene; β-carene; nonpinane; 2-norpinene; apopinane; apopinene; orthodene; norpadiene; homopinene; pinane; 2-pinene;

3-pinene; β-pinene; verbenene; homoverbanene; 4-methylene-2-pinene; norcamphane; apocamphane; campane; α-fenchane; α-fenchene; sartenane; santane; norcamphene; camphenilane; fenchane; isocamphane; β-fenchane; camphene; β-fenchane; 2-norbornene; apobornylene; bornylene; 2,7,7-trimethyl-2-norbornene; santene; 1,2,3,-trimethyl-2-norbornene; isocamphodiene; camphenilene; isofenchene and 2,5,-trimethyl-2-norbornene.

16. A low temperature heat transfer process using a heat transfer fluid composition comprising:
  a. transferring thermal energy from the heat transfer fluid composition to a cooling fluid such that the heat transfer fluid composition is cooled to a temperature between about 0° and about −175° F.;
  b. transferring thermal energy from an object to be cooled to the heat transfer fluid composition; and,
  c. repeating (a) and (b) until said object is cooled to the desired temperature; wherein said heat transfer fluid composition consisting essentially of: (a) 10% to 90% by volume of at least one terpene component; and (b) 90% to 10% by volume of at least one alkylbenzene component; in complementary proportional percentage amounts to retain the composition in its liquid phase at any temperature in the entire range from about 0° F. to about −175° F.

17. The process of claim 16, wherein the thermal energy is transferred from the heat transfer fluid composition to at least one cryogenic fluid or a refrigerant.

18. The process of claim 16, wherein the process is operated under conditions such that the temperature of the heat transfer fluid composition ranges from about 0° F. to between about −120° F. and about −175° F.

19. The process of claim 16, wherein the at least one terpene of the terpene component is selected from the group consisting of acyclic terpenes, monocyclic terpenes and bicyclic terpenes.

20. The process of claim 16, wherein the at least one terpene is selected from the group consisting of d-limonene, terpinolene, α-terpinene, γ-terpinene, myrcene, 3-carene, sabinene, α-pinene and camphene and the at least one alkylbenzene is selected from the group consisting of cumene diethylbenzene, methyl propyl benzene, propyl benzene and butyl benzene.

21. The process of claim 19, wherein the acyclic terpenes are selected from the group consisting of geraniolene; myrcene; dihydromyrcene, ocimene and allo-ocimene.

22. The process of claim 19, wherein the monocyclic terpenes are selected from the group consisting of ρ-menthane; carvomethene; methene, dihydroterpinolene; dihydrodipentene; α-terpinene; γ-terpinene; α-phellandrene, pseudolimonene; limonene; d-limonene; 1-limonene; d,1-limonene; isolimonene; terpinolene; isoterpinolene; β-phellandrene; β-terpinene; cyclogeraniolane; pyronane; α-cyclogeraniolene; β-cyclogeraniolene; γ-cyclogeraniolene; methyl-γ-pyronene; 1-ethyl-5,5-dimethyl-1,3-cyclohexadiene; 2-ethyl-6,6-dimethyl-1,3-cyclohexadiene; 2-ρmenthene; 1(7)ρ-methadiene; 3,8-ρ-menthene; 2,4-ρ-menthadiene; 2,5-ρ-menthadiene; 1(7),4(8)-ρ-methadiene; 3,8-ρ-menthadiene; 1,2,3,5-tetramethyl-1-3-cyclohexadiene; 1,2,4,6-tetramethyl-1,3-cyclohexadiene; 1,6,6-trimethylcyclohexene and 1,1-dimethylcyclohexane.

23. The process of claim 19, wherein the bicyclic terpenes are selected from the group consisting of norsabinane; northujene; 5-isopropylbicyclohex-2-ene; thujane; β-thujene; α-thujene; sabinene; 3,7-thujadiene; norcarane; 2-norcarene; 3-norcarene; 2-4-norcaradiene; carane; 2-carene; 3-carene; β-carene; nonpinane; 2-norpinene; apopinane; apopinene; orthodene; norpadiene; homopinene; pinane; 2-pinene; 3-pinene; β-pinene; verbenene; homoverbanene; 4-methylene-2-pinene; norcamphane; apocamphane; campane; α-fenchane, α-fenchene; santenane; santane; norcamphene; camphenilane; fenchane; isocamphane; β-fenchane; camphene; β-fenchane; 2-norbornene; apobornylene; bornylene; 2,7,7-trimethyl-2-norbornene; santene; 1,2,3,-trimethyl-2-norbornene; isocamphodiene; camphenilene; isofenchene and 2,5,5-trimethyl-2-norbornene.

* * * * *